United States Patent [19]
Hino et al.

[11] Patent Number: 5,174,834
[45] Date of Patent: Dec. 29, 1992

[54] ALUMINA SHORT FIBER REINFORCED MAGNESIUM ALLOY HAVING STABLE OXIDE BINDERS

[75] Inventors: Harumichi Hino; Mikiya Komatsu, both of Kanagawa; Kenichi Shibata, Tokyo; Mitsushi Wadasako, Tokyo; Junichi Ogawa, Tokyo, all of Japan

[73] Assignees: Nissan Motor Company, Limited; Nichias Corporation, both of Japan

[21] Appl. No.: 638,987

[22] Filed: Jan. 10, 1991

[30] Foreign Application Priority Data

Jan. 12, 1990 [JP] Japan .................................. 2-5842

[51] Int. Cl.$^5$ .............................................. C22C 23/00
[52] U.S. Cl. .................................. 148/420; 428/614; 428/632
[58] Field of Search ................. 148/420; 628/632, 614

[56] References Cited

U.S. PATENT DOCUMENTS

| | | | |
|---|---|---|---|
| 4,515,866 | 5/1985 | Okamoto et al. | 428/614 |
| 4,595,638 | 6/1986 | Dohnomoto et al. | 428/614 |
| 4,752,537 | 6/1988 | Das | 428/614 |
| 4,818,633 | 4/1989 | Dinwoodie et al. | 428/614 |
| 5,002,836 | 3/1991 | Dinwoodie et al. | 428/614 |

FOREIGN PATENT DOCUMENTS 0208042 11/1984 Japan ................................... 148/420

Primary Examiner—Upendra Roy
Attorney, Agent, or Firm—Lowe, Price, LeBlanc & Becker

[57] ABSTRACT

A process of production of alumina short fiber reinforced magnesium or magnesium alloy product features formation of alumina short fiber pre-form utilizing a inorganic binder which is composed of one or more oxides having thermodynamically stability equivalent to or higher than MgO. In the alternative, the composite almina fiber and binder surfaces of the alumina short fiber pre-form can be coated by a baked coating layer. Pressure casting of molten magnesium or magnesium alloy is then performed for forming the final products.

11 Claims, 8 Drawing Sheets

50μm

ALUMINA SHORT FIBER REINFORCED MAGNESIUM ALLOY HAVING STABLE OXIDE BINDERS

BACKGROUND OF THE INVENTION

1. Field of the Invention

The present invention relates generally to an alumina short fiber reinforced magnesium or magnesium alloy product which does not contain reaction product detrimental to mechanical characteristics. More specifically, the invention relates to a process of producing an alumina short fiber reinforced magnesium or magnesium alloy product, which does not produce reaction products detrimental to mechanical characteristics, such as fatigue characteristics, creep characteristics and so forth.

2. Description of the Background Art

Conventionally, alumina short fiber reinforced magnesium or magnesium alloy products have been produced through pressure pouring or pressure casting process. In the conventionally known process, an alumina short fiber pre-form is formed through vacuum forming process utilizing silica type or alumina type binder. The alumina short fiber pre-form is then set in a casting mold. Thereafter, molten magnesium or magnesium alloy is supplied in the casting mold. Then, pressure casting is performed by exerting pressure through a movable mold to impregnate the molten magnesium or magnesium alloy into the alumina short fiber pre-form.

In the conventional process, colloidal silica ($SiO_2$) or colloidal alumina ($Al_2O_3$) have been used as binders for binding the alumina short fiber for forming the pre-form. Silicon (Si) contained in the colloidal silica and aluminium (Al) contained in the colloidal alumina have a tendency to be reduced by elemental reaction during impregnation of molten magnesium or magnesium alloy. This causes increasing of concentration of Si or Al to cause segregation of $Mg_2Si$ or $Mg_{17}Al_{12}$. Such segregation can particularly formed at the leading edge portion of impregnation. Such segregating reacting products are brittle to cause breakage at the initial stage of plastic deformation and degrade mechanical characteristics, such as fatigue characteristics, creep characteristics of the alumina short fiber reinforced magnesium or magnesium alloy products.

SUMMARY OF THE INVENTION

Therefore, it is an object of the present invention to provide a process of producing a alumina short fiber reinforced magnesium or magnesium alloy product with enhanced mechanical characteristics.

Another object of the invention is to provide a process of producing alumina short fiber reinforced magnesium or magnesium alloy without producing reaction products which affects for mechanical characteristics.

In order to accomplish aforementioned and other objects, a process of production of alumina short fiber reinforced magnesium or magnesium alloy product, according to the present invention, features formation of alumina short fiber pre-form utilizing a inorganic binder which is composed of one or more oxides having thermodynamically stability equivalent to or higher than MgO. In the alternative, the composite almina fiber and binder surfaces of the alumina short fiber pre-form can be coated by a baked coating layer. Pressure casting of molten magnesium or magnesium alloy is then performed for forming the final products.

According to one aspect of the invention, an alumina short fiber reinforced magnesium or magnesium alloy is composed of:
an alumina short fiber pre-form formed by binding elemental alumina short fiber with a binder, the pre-form having at least one oxide at least on the surface, which oxide has equivalent to or higher thermodynamic stability than MgO; and
magnesium or magnesium alloy matrix impregnating in the pre-form.

The binder may be composed of inorganic oxide. Preferably, the inorganic oxide may be selected among MgO, $Li_2O$, CaO, $ZrO_2$ and so forth. Alternatively, the pre-form may have a coating layer of an inorganic salt or oxide, hydroxide or hydrate of a metal.

According to another aspect of the invention, a process for producing an alumina short fiber reinforced magnesium or magnesium alloy product, comprises the steps of:
preparing an alumina short fiber pre-form with an alumina short fiber and a binder in such that the pre-form has thermo-dynamical stability equivalent to or higher than MgO at least at the surface thereof;
setting the pre-form in a pressure casting molding;
pouring molten magnesium or magnesium alloy matrix in the pressure casting molding and performing pressure casting to produce the product.

The binder may be an inorganic oxide having thermodynamical stability equivalent to or higher than MgO.

In the alternative, the process may further comprise a process for forming a surface coating layer which has thermo-dynamical stability equivalent to or higher than MgO. The step of forming the coating layer may be performed by preparing coating solution of one or more inorganic salt, forming layer of the coating solution on the surface of the fiber and binder, recrystallizing the inorganic salt for forming the coating layer. In such case, the step of forming coating layer further comprising a step of performing baking to increase density of inorganic salt on the surface of the fiber and binder.

Alternatively, the step of forming coating layer may be performed by preparing organic solvent solution containing metal alkoxide, forming layer of the organic solvent solution on the surface of the fiber and the binder, exposing the organic solvent solution to the atmosphere for absorption of water in the atmosphere and causing hydrolysis for forming oxide, hydroxide and hydrate of metal. In such case, the step of forming coating layer further comprises the step of performing baking for forming high density coating layer.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DETAILED DESCRIPTION OF THE INVENTION

According to the present invention, the preferred process of production of an alumina short fiber reinforced magnesium or magnesium alloy products, uses a pre-form of alumina short fiber. The pre-form is formed utilizing inorganic binder composed of one or more oxides which have equivalent to or higher thermal stability to MgO. The pre-form thus prepared is placed within a molding for pressure casting. Molten magnesium or magnesium alloy is then poured in the casting mold for subsequently performing pressure molding for impregnating the molten magnesium or magnesium alloy into the pre-form to form the alumina short fiber reinforced magnesium or magnesium alloy products.

In the alternative, the pre-form of the alumina short fiber is formed utilizing alumina binder such as that used in the conventional process. Then, the alumina short fiber pre-form is coated by solution of coating agent and subsequently cooled for forming coating layer on the surfaces of each fiber forming the pre-form. Through this process, the alumina short fiber pre-form with high density coating layer on binder surface can be formed. Subsequent, pressure casting is performed by setting the pre-form within the casting mold. Preferably, the coating solution may contain one or more inorganic salts. In such case, by drying the solution, inorganic salt can be re-crystallized on the surface of binder. Further preferably, baking treatment is performed subsequently of drying process for forming high density coating layer. Alternatively, the coating solution can be composed of organic solvent solution containing metallic alkoxide. Alkoxide in the solution is subject 40 hydrolysis by absorbing water in the atmosphere to form a coating layer of oxide, hydroxide or hydrate of metal on the alumina short fiber and binder surfaces. Furthermore, by baking, a coating layer with increased density can be obtained. In the later cases, the coating layer should have a thermal stability equivalent to or higher than MgO.

Preferably, alumina short fiber to be used in the preferred process according to the invention should have alumina content higher than or equal to 90 Wt% or higher and remainder of $SiO_2$ or so forth. Furthermore, as a material for a binder or for a coating layer, one or two selected among MgO, $Li_2O$, CaO, $ZrO_2$ and so forth are used.

Figure 1:
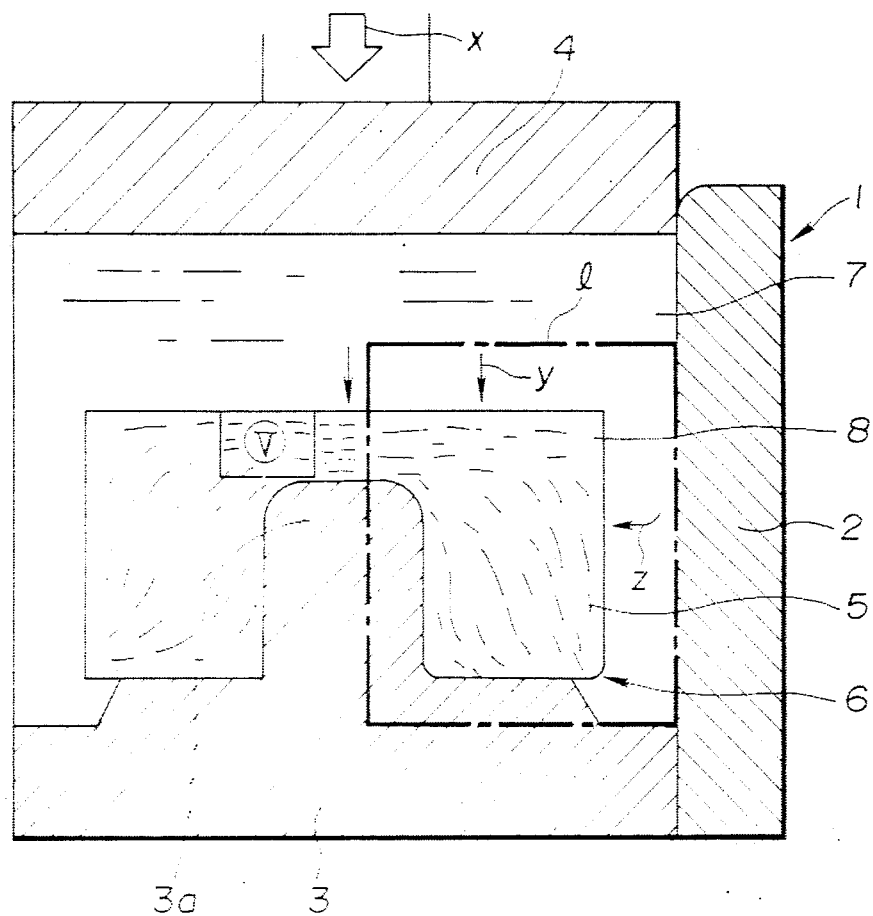
FIG. 1 is a general and explanatory illustration showing apparatus generally used for performing pressure casting for impregnating molten magnesium or magnesium alloy into an alumina short fiber pre-form.

Similarly to that in the prior art, a pressure casting is performed utilizing a pressure casting apparatus as illustrated in FIG. 1. As can be seen, the shown example of the pressure casting apparatus is desired to produce an alumina short fiber reinforced magnesium or magnesium alloy product 8 with a recess conforming to a projection 3a projecting from the bottom 3 of a female die 1 which further comprises a side wall 2 and an upper die 4. An alumina short fiber pre-form 6 which is formed with alumina short fiber 5, is tightly fitted onto the projection 3a.

Figure 2:
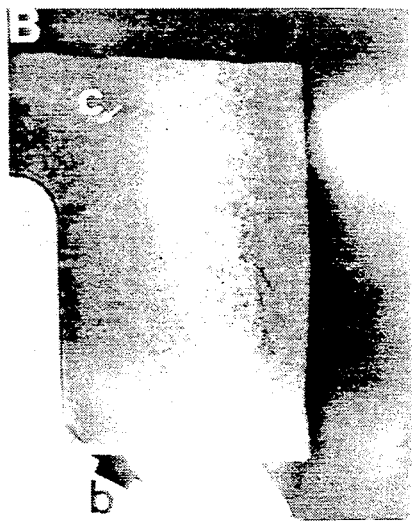
FIG. 2 is an electromicroscopic photograph of the alumina short fiber reinforced magnesium or magnesium alloy block produced through the preferred process according to the present invention.
Figure 3:
FIGS. 3 and 4 are enlarged electromicroscopic photograph of portions b and c in FIG. 2.
Figure 4:
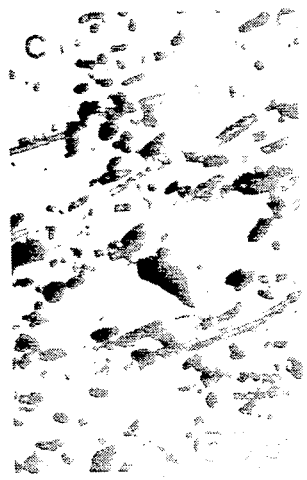

Magnesium or magnesium alloy matrix is filled in the casting mold. Subsequently, a pressure casting is performed in the known manner with an exerting pressure along the arrow x through the upper die 4 so as to impregnate molten magnesium or magnesium alloy into the alumina short fiber pre-form 6. With the pressure, impregnation of the molten magnesium or magnesium alloy matrix generally in the directions of arrows y and z. FIG. 2 shows electromicroscopic photograph of portion 1 in FIG. 1. Furthermore, the enlarged microstructure of the alumina short fiber reinforced magnesium or magnesium alloy product impregnating magnesium or magnesium alloy matrix in the alumina short fiber pre-form at portions b and c, is shown in FIGS. 3 and 4.

EXAMPLE 1

Figure 5A:
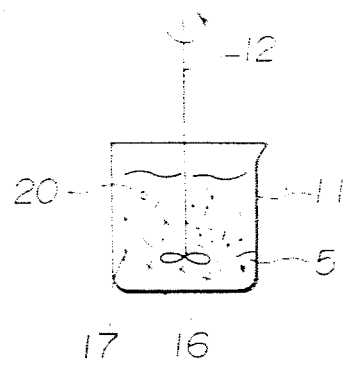
FIGS. 5(a) to 5(d) are illustration showing process of forming alumina short fiber pre-form to be used for production of the alumina short fiber reinforced magnesium and magnesium alloy product according to the invention.
Figure 5B:
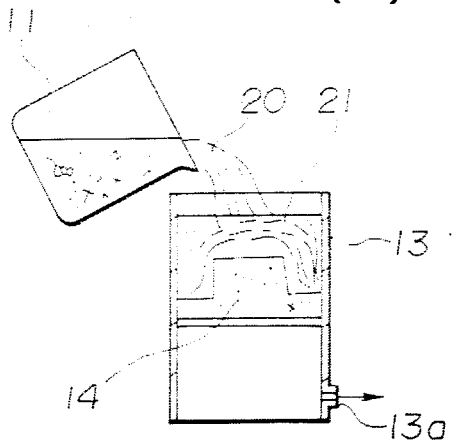

The alumina short fiber pre-form 6 to be used in the preferred process according to the present invention, is prepared through the process illustrated in FIGS. 5(a) to 5(d). As shown in FIG. 5(a), alumina short fiber 5 having composition of $Al_2O_3/SiO_2=95/5$ and water 16 is put in a container 11 and stirred by means of a stirring device 12 so that alumina short fiber is dispersed in water. As an inorganic binder 17, magnesium nitrate which can be converted into magnesia (MgO) is added so that the weight of magnesia becomes 10 Wt% versus the weight of alumina short fiber 17. Furthermore, polyacryl amid is added in 1 Wt% versus the weight of the alumina short fiber for better binding ability. By stirring the aforementioned materials in the container 11, material slurry is formed. Then, the material slurry thus prepared is filled in a molding 13 which has a porous die 14. The molding 13 has an ventilation port 13a. Vacuum pressure is applied through the ventilation port 13a to withdraw water from the slurry 20 in the molding for dehydration. Thus, a dehydrated pre-form 21 is prepared.

Figure 5C:
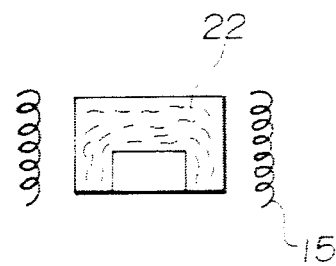
Figure 5D:
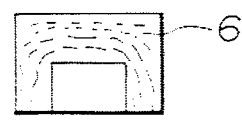

The dehydrated pre-form 21 is then subjected to a baking process in a manner shown in FIG. 5c. Baking process is performed by means of a heater 15 at a temperature of 1200° C. By this, the final pre-form 6 is formed.

The alumina short fiber pre-form 6 thus prepared is preheated at a temperature of 800° C. before setting in the molding for pressure casting in FIG. 1. In this example, magnesium (QE22) matrix 7 is prepared at a temperature of 720° C. The molten matrix 7 is poured in the pressure casting molding 1. Thereafter, pressure is exerted through the upper die 4 in a magnitude of 1000 bar for performing pressure casting.

Through the foregoing process, the product having the macro-structure as shown in FIG. 2, the micro-structure as shown in FIGS. 3 and 4 can be produced. As can be seen in FIG. 2, the product has an uniform macro-structure. On the other hand, as observed from FIGS. 3 and 4, no reaction products which can affect mechanical characteristics of the product can be found at final impregnation region of molten matrix.

Figure 6:
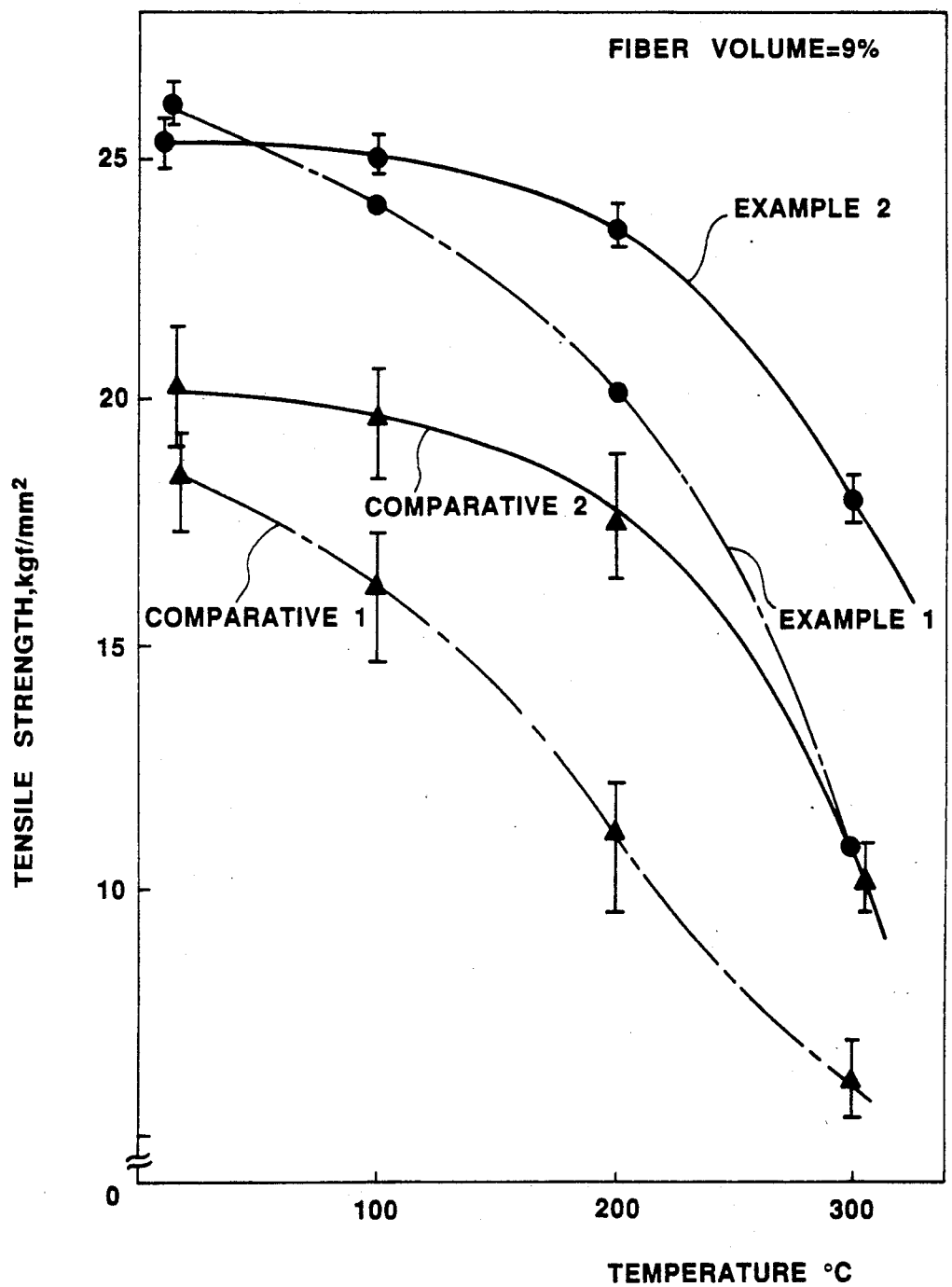
FIG. 6 is a graph showing variation of tensile stress in the alumina short fiber reinforced magnesium or magnesium alloy products produced through the preferred process according to the invention, as well as the products produced through conventional processes.
Figure 12:
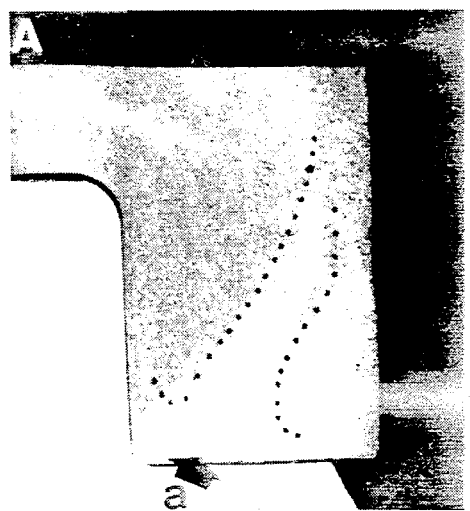
FIG. 12 is a microscopic photograph of the products through the conventional process.
Figure 13:
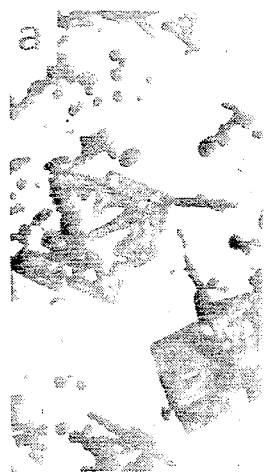
FIG. 13 is an enlarged microscopic photograph of portion a in FIG. 12.
Figure 14:
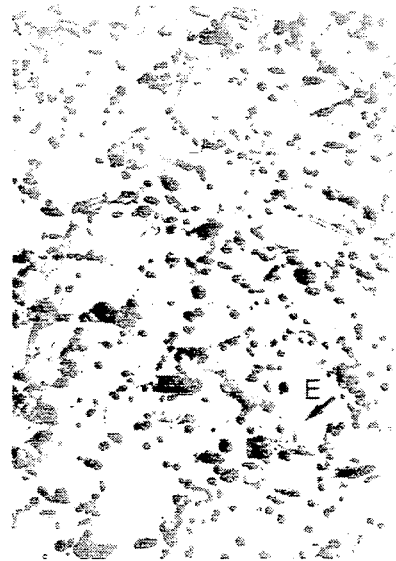
FIG. 14 is a microscopic photograph showing microstructure of the comparative example at the portion a in FIG. 12.

For the product 8 thus produced, tensile strength is tested. The tensile strength as the result of testing is shown in FIG. 6. In order to compare with this, a comparative example is prepared with magnesium (GE22) matrix and silica binder. The comparative example thus prepared had macro-structure as shown in FIG. 12 and micro-structure as shown in FIG. 13. As clear from FIG. 12, the comparative example contains segregation of $Mg_2Si$ and $Mg_{17}Al_{12}$ which are produced through the reaction expressed by the following formulae:

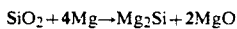

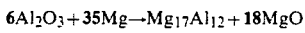

For this comparative example, tensile test is also performed. Result is also shown in FIG. 6. As can be seen in FIG. 6, the product 8 produced through the preferred process has a much higher tensile strength than that in the comparative example. Thus, it has been proven that the preferred process according to the present invention improves the tensile strength.

EXAMPLE 2

In this example, an alumina short fiber pre-form 6 is formed of different material. In this example, alumina short fiber 5 of $Al_2O_3/SiO_2 = 90/10$ and water 16 are mixed in the container 11 for dispersing the fiber in water. To this, a mixture of magnesium nitrate as a material for magnesia which serves as inorganic binder, and lithium nitrate as secondary material, which is prepares so that the $MgO/Li_2O$ is 90/10. The mixture is added so that weight of $MgO/Li_2O$ is 10 Wt% versus the weight of alumina short fiber 5. Furthermore, in order to obtain better binding ability, polyacryl amid is added in a weight of 1 Wt% of the weight of the alumina short fibers.

The slurry thus prepared is dehydrated in the molding 13 in FIG. 7(b) and then baked by the heater 15 as shown in FIG. 7(c) at a temperature of 1200° C. The pre-form 6 thus produced is preliminarily heated at a temperature of 800° C. before setting in the pressure casting molding. Subsequently, molten matrix 7 of Mg-5 Wt% Nd alloy is poured in the molding 1. Pressure casting is performed substantially the same manner as that set forth above. Thus, an alumina short fiber reinforced magnesium alloy product 8 is obtained.

The product 8 has a macro-structure equivalent to that shown in FIG. 2 and micro-structure equivalent to that shown in FIGS. 3 and 4. Therefore, macro-structure exhibits high uniformity. On the other hand, no reaction product which is detrimental to mechanical characteristics of the product can be observed in the micro-structure.

For this product, tensile test is performed for checking tensile strength. The result of tensile test is shown in FIG. 6. To compare with this, comparative example was prepared with Mg-5 Wt% Nd alloy and silica binder. The result of tensile test performed for this comparative example is also shown in FIG. 6.

Therefore, in this case higher tensile strength is obtained in the product of the invention is much higher than that in the comparative example.

EXAMPLE 3

Figure 7:
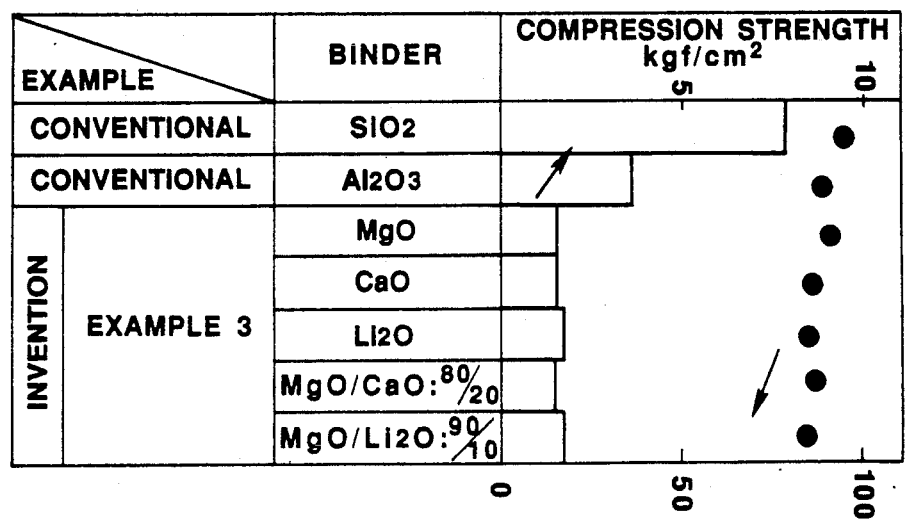
FIG. 7 is a table showing composition of the product according to the invention and comparative examples in the prior art.

Through the same process as that of the example 1, alumina short fiber pre-forms are prepared with different composition of binders. Respective binders are added in 10 Wt% of versus the weight of the alumina short fiber. For each pre-form, characteristics of the pre-forms per se was evaluated. The results of evaluation is shown in the table in FIG. 7. In FIG. 7, the compression strengths of the pre-forms at 10% compression are shown by bar graphs and volumes (V in FIG. 1) of pre-form after pressure casting is indicated by solid circle. As clear from FIG. 7, the pre-forms prepared through the preferred process has a lower compression strength. However, since the compression strength required for a fiber pre-form for a high pressure casting is greater than or equal to 80% (20% compression), the compression strength of the pre-form is sufficient.

Figure 8:
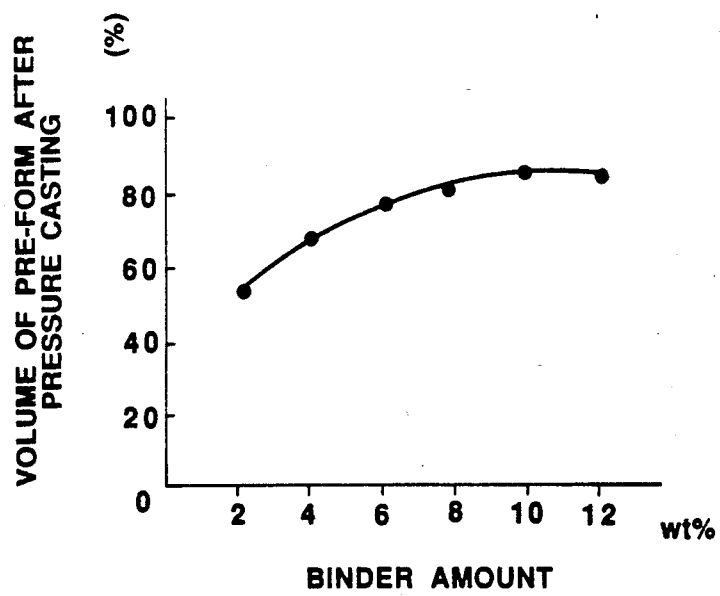
FIG. 8 is a graph showing variation of the volume of pre-form versus amount of binder.

Among various samples prepared for evaluation, the pre-form prepared utilizing binder of $MgO/Li_2O = 90/10$ is selected. With respect to the selected sample, the relationship between amount of binder and volume of the pre-form after pressure casting was checked. Result is shown in FIG. 8. From FIG. 8, it was found that appropriate amount of binder was 6 Wt% to 10 Wt%.

With various samples, alumina short fiber reinforced magnesium or magnesium alloy products are produced. In all samples, no reaction products detrimental to mechanical property of the products, was found.

EXAMPLE 4

Figure 10A:
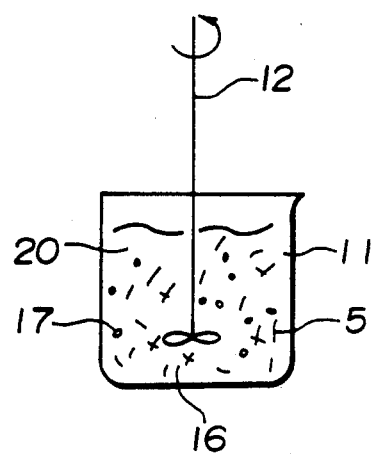
FIGS. 10(a) through 10(g) show process for producing an example 4 according to the invention.
Figure 10B:
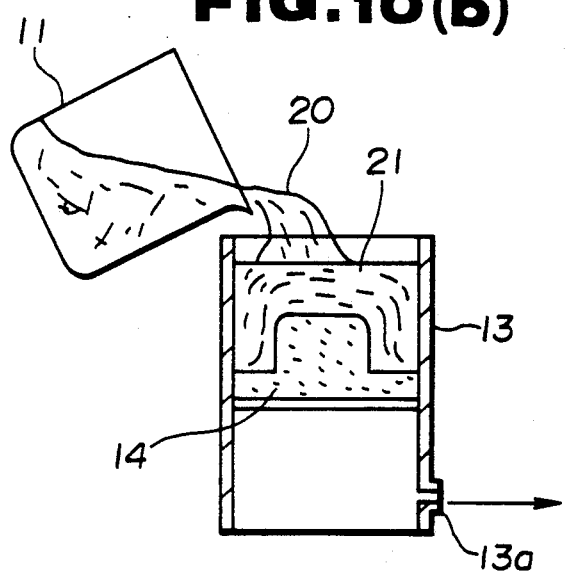
Figure 10C:
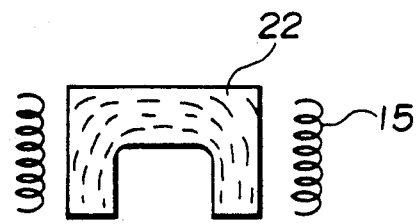
Figure 10D:
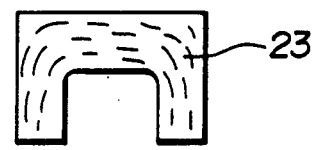
Figure 10E:
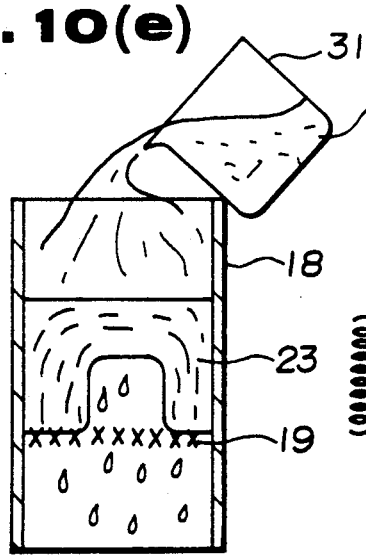
Figure 10F:
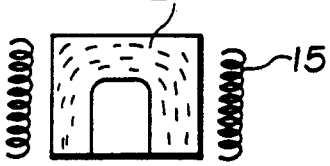
Figure 10G:
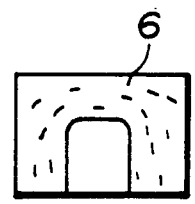

In this example, the alumina short fiber pre-form was prepared through the process illustrated in FIGS. 10(a) through 10(g). In this example, alumina short fiber 5 ($Al_2O_3/SiO_2 = 95/5$) is mixed with water 16 and stirred by means of the stirring device 12. Binder composed of colloidal alumina was added so that the amount of the colloidal alumina is of 2 Wt% versus the weight of the alumina short fiber. Similarly to the former examples, polyacryl amid is added for 1 Wt% of the weight of the alumina short fiber. Material slurry was filled in a molding 13. As set forth, dehydration of the slurry is then performed by removing water through the porous die. The dehydrated pre-form 22 is subject 40 baking treatment by means of the heater 15 at a temperature of 1200° C. to obtain baked pre-form 23 as shown in FIG. 10(d). Thereafter, the baked pre-form 23 is set on a filter 19 in a cylinder 18. A coating solution 30 is poured from a container 31 to the cylinder 18, as shown in FIG. 10(e). Here, in the shown example, the coating solution 30 is composed of a solution of magnesium nitrate. The coating solution is impregnated so that 5 Wt% of magnesia (MgO) can be produced through drying and baking process. Subsequently, the pre-form impregnated with the coating solution is dried. By drying the coating solution, magnesium nitrate is recrystallized on the surface of the pre-form 24. Subsequently, the pre-form with recrystallized magnesium nitrate layer is subject to baking process as shown in FIG. 10(f) by means of the heater 15 at a temperature of 1200° C. In the process of baking, density of the re-crystallized magnesium nitrate is increased.

The alumina short fiber pre-form 6 thus prepared was analyzed by X-ray analysis. Spinal phase ($MgO \cdot Al_2O_3$) was observed in addition to deflection pattern of the fiber per se. From this, it has been appreciated that the magnesium ion in the coating layer is dispersed within the internal structure of the fiber and binder to form high density spinel coating layer containing magnesium ion.

Figure 9:
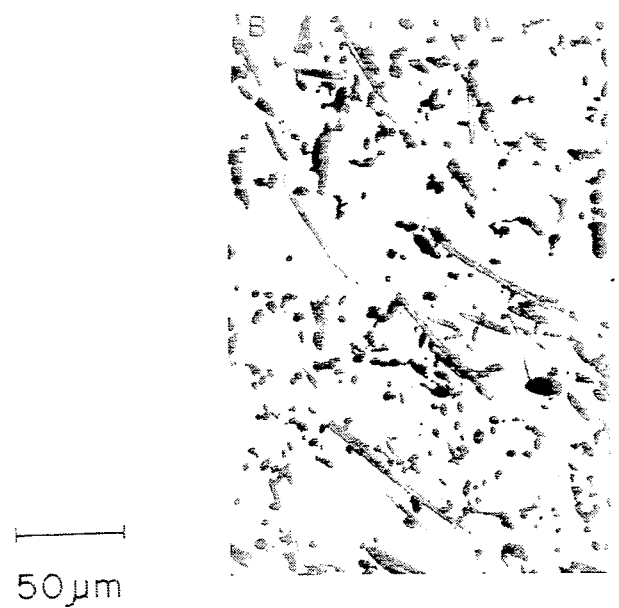
FIG. 9 is a electromicroscopic photograph showing micro-structure of the product.

Then, the alumina short fiber pre-form 6 thus prepared was preheated at a temperature 800° C. The preheated pre-form 6 is set on the projection 3a of the die 3. Then, molten matrix of industrial pure magnesium at a temperature of 720° C. is poured in the molding 1. Then, pressure molding is performed by exerting pressure at 1000 bar through the upper die 4. The microstructure at the final impregnation region of the molten matrix is shown in FIG. 9. As can be seen from FIG. 9, with the barrier effect of the spinel coating layer, generation of reaction product which is detrimental to the mechanical characteristics of the product can be successfully prevented.

EXAMPLE 5

In this example, the coating solution is composed of magnesium nitrate as a first composition and lithium nitrate as a second composition. The first and second compositions are mixed in such a ratio that $MgO/Li_2O$ of 90/10 can be established. The total weight of $MgO/Li_2O$ is adjusted to be 5 Wt% of the weight of the alumina short fiber. The fiber pre-form 23 as shown in FIG. 10(d) is dipped for impregnating the coating solution within the pre-form. Subsequently, the coating solution is dried and baked. The pre-form thus prepared is set in the pressure casting molding 1. For this, molten matrix of Mg-5 Wt% Nd alloy is poured. Then, pressure casting is performed.

Figure 11:
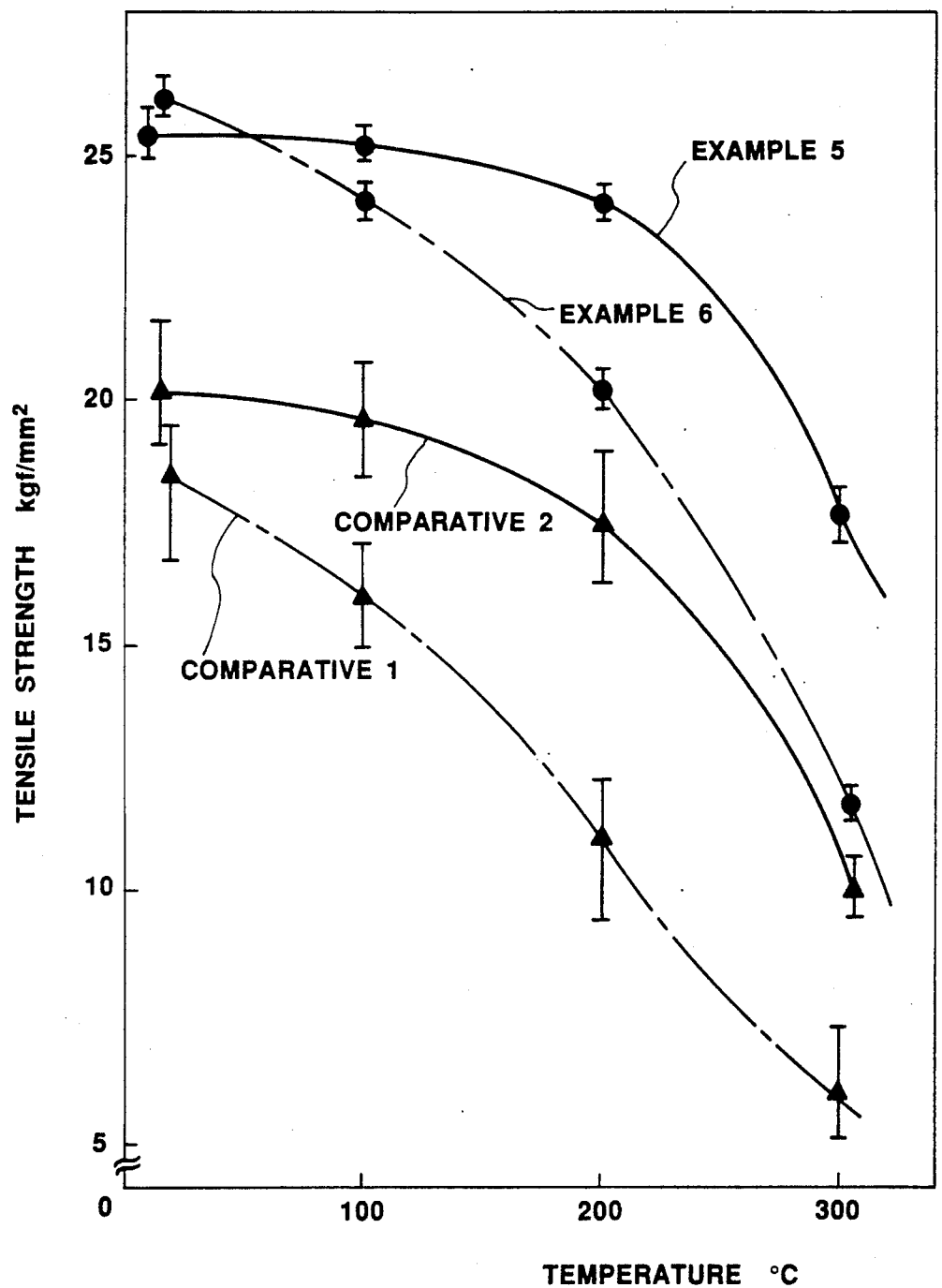
FIG. 11 is a graph showing variation of tensile strength versus temperature of the examples 5 and 6 of the invention and comparative examples 1 and 2.

Similarly to the foregoing examples, the alumina short fiber reinforced magnesium alloy thus produced has no reaction products which is detrimental to the mechanical characteristics. For such alumina short fiber reinforced magnesium alloy product, tensile test was performed. The result of the tensile test is illustrated in FIG. 11. In order to compare with this, comparative example 2 was prepared with Mg-5 Wt% Nd matrix and silica binder. Tensile test was performed with respect to the comparative example 2. As can be seen from the results of tensile test as illustrated in FIG. 11, substantial improvement with the product according to the invention can be proven.

EXAMPLE 6

In this example, as organic solvent solution containing metallic alkoxide, magnesium methoxide methanol solution containing 5 Wt% of magnesia (MgO) versus the weight of the alumina short fiber is prepared. To this solution, the alumina short fiber pre-form 23 is dipped. After withdrawing from the solution, the performed with the solution is exposed to the atmosphere for absorbing water in the atmosphere to cause hydrolysis. By hydrolysis of the solution, gel form magnesium hydrate coat layer is uniformly formed. Then, the pre-form with the coat layer is dried and baked at a temperature of 1200° C. to form spinel coat layer ($MgO \cdot Al_2O_3$) with high density.

Subsequently, pressure casting is performed with the magnesium (QE22) molten matrix was performed utilizing the apparatus of FIG. 1. In the alumina fiber reinforced magnesium product, reaction product detrimental to mechanical characteristics of the product.

Result of tensile test performed with respect to the example 6 is illustrated in FIG. 11. For comparison purpose, result of tensile test performed with respect to the comparative example 1 which is produced of magnesium (QE22) matrix with silica binder is also illustrated in FIG. 11. As can be seen from FIG. 11, it is evident that the present invention significantly improves the tensile strength.

EXAMPLE 7

As a coating solution, zirconium-n-buthoxide xylene solution which is partially stabilized composition of 2.6% of yttria, corresponding to 5 Wt% in zirconia concentration, was prepared. To this coating solution, alumina short fiber pre-form is dipped. After dipping, the pre-form with the coating solution wetting the surface of the pre-form is exposed to atmosphere to absorb water to cause hydrolysis. Then, the dried pre-form was subject to baking process to form high density coating layer of partially stabilized zirconia on the alumina short fiber and binder. Utilizing this pre-form, pressure casting is performed with Mg-5% Nd alloy matrix.

The alumina short fiber reinforced magnesium alloy product of example 7 has no reaction product which is detrimental to mechanical characteristics.

As can be appreciated herefrom, the alumina short fiber reinforced magnesium or magnesium alloy products produced according to the invention significantly improve mechanical characteristics and thus fulfills all of the objects and advantages sought therefor.

While the present invention has been discussed hereabove in terms of the preferred embodiment of the invention, the invention should be appreciated to be restricted for the shown embodiment. The invention can be embodied in various fashion. Therefore, the invention should be interpreted to include all possible embodiments and modifications which can be embodies without departing from the principle of the invention set out in the appended claims.

What is claimed is:

1. A fiber reinforced metal product, comprising:
    a pre-form comprising alumina short fibers and an oxide binder selected from the group consisting of $Li_2O$, CaO; a mixture of MgO and $Li_2O$ and a mixture of MgO and CaO; and a matrix containing a metal selected from the group consisting of magnesium and a magnesium alloy, said matrix impregnating into said pre-form.

2. A fiber reinforced metal product, comprising:
    a pre-form comprising alumina short fibers and an oxide binder;
    a coating layer on surfaces of said alumina short fibers and said oxide binder; and
    a matrix containing a metal selected from a group consisting of magnesium and a magnesium alloy, said matrix impregnating into said pre-form.

3. A fiber reinforced metal product as claimed in claim 2, wherein said oxide binder contains colloidal alumina ($Al_2O_3$).

4. A fiber reinforced metal product as claimed in claim 2, wherein said coating layer contains inorganic oxides.

5. A fiber reinforced metal product as claimed in claim 2, wherein said coating layer contains metal oxides.

6. A fiber reinforced metal product as claimed in claim 2, wherein said coating layer includes a spinel structure.

7. A fiber reinforced metal product as claimed in claim 3, wherein said coating layer includes a spinel structure of the $MgOAl_2O_3$ type.

8. A fiber reinforced metal product as claimed in claim 7, wherein said coating layer is formed by impregnating a coating solution of magnesium nitrate into said pre-form, drying said coating solution on said pre-form until magnesium nitrate is recrystallized, and subjecting said pre-form with said recrystallized magnesium nitrate to baking.

9. A fiber reinforced metal product as claimed in claim 7, wherein said coating layer is formed by impregnating a coating solution of a mixture of magnesium nitrate and lithium nitrate into said pre-form, drying said coating solution on said pre-form, and subjecting said pre-form with said coating solution to baking.

10. A fiber reinforced metal product as claimed in claim 7, wherein said coating layer is formed by dipping said pre-form into a methanol solution of metallic alkoxide, exposing said pre-form with said solution to air until gel form magnesium hydrate is formed thereon, and baking said pre-form.

11. A fiber reinforced metal product as claimed in claim 7, wherein said coating layer is formed by dipping said pre-form into a xylene solution of zirconium-n-butoxide, exposing said pre-form with said solution to air, and baking said pre-form to form partially stabilized zirconia.

* * * * *